United States Patent [19]
Iizuka

[11] Patent Number: 5,996,644
[45] Date of Patent: Dec. 7, 1999

[54] DUCT JOINT STRUCTURE, ASSEMBLY TOOL, DUCT ASSEMBLY METHOD AND HANGER

[75] Inventor: Shozo Iizuka, Himeji, Japan

[73] Assignee: Jam Kabushiki Kaisha, Hyogo, Japan

[21] Appl. No.: 08/855,185

[22] Filed: May 13, 1997

[51] Int. Cl.⁶ .................................................. F16L 9/00
[52] U.S. Cl. ..................... 138/163; 138/157; 138/162; 138/177; 138/DIG. 4
[58] Field of Search .................................. 138/157, 155, 138/162, 163, 177, DIG. 14; 248/58, 301, 339

[56] References Cited

U.S. PATENT DOCUMENTS

| | | | |
|---|---|---|---|
| 2,286,118 | 6/1942 | Sleeth | 248/53 |
| 2,847,034 | 8/1958 | Swett | 138/163 X |
| 3,089,521 | 5/1963 | Paiement | 138/163 X |
| 3,312,442 | 4/1967 | Moeller | 248/301 X |
| 3,858,540 | 1/1975 | Berg | 138/163 X |
| 4,423,284 | 12/1983 | Kaplan | 138/163 X |
| 4,681,155 | 7/1987 | Kredo | 138/163 X |
| 5,125,199 | 6/1992 | Whitney et al. | 138/162 X |

FOREIGN PATENT DOCUMENTS

| | | | |
|---|---|---|---|
| 5-172281 | 7/1993 | Japan | 138/162 |

*Primary Examiner*—Patrick Brinson
*Attorney, Agent, or Firm*—Marshall, O'Toole, Gerstein, Murray & Borun

[57] ABSTRACT

A duct joint structure for assembling a duct used for air conditioning or venting equipment, an assembly tool for assembling the joint portion, an assembly method of a duct, and a hanger for the duct with the duct joint structure. A duct joint structure includes at least two duct plate members arranged substantially at right angles in a sectional view. An end of a first plate member is bent substantially in accordance with the orthogonal relation, and the second plate member is formed at the forward end thereof with a U-shaped groove to accommodate the bent portion of the first plate member. A guide rail is protruded at not less than 90 degrees with respect to the outer surface of the second plate member from the side thereof spaced from the U-shaped groove.

12 Claims, 18 Drawing Sheets

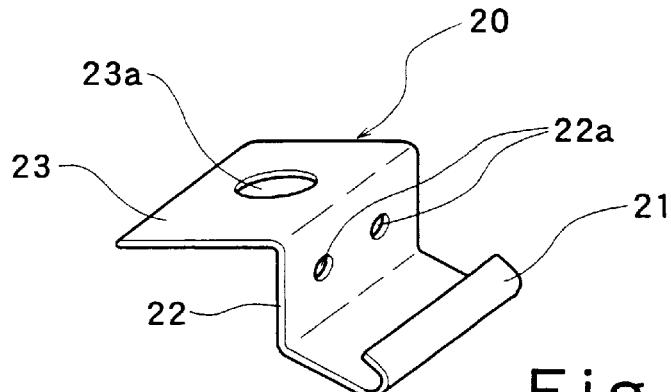
Fig.13
Fig.14
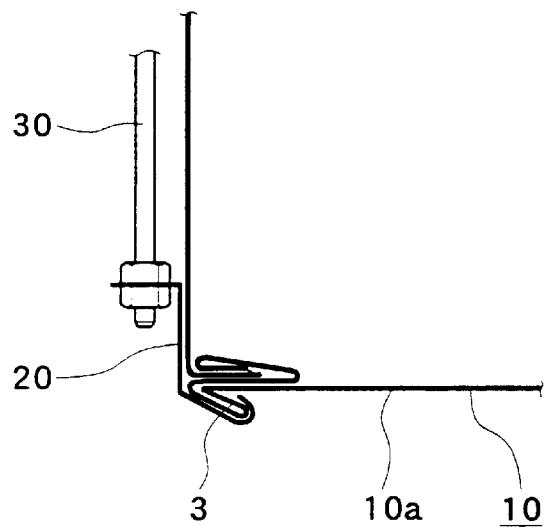
Fig.15
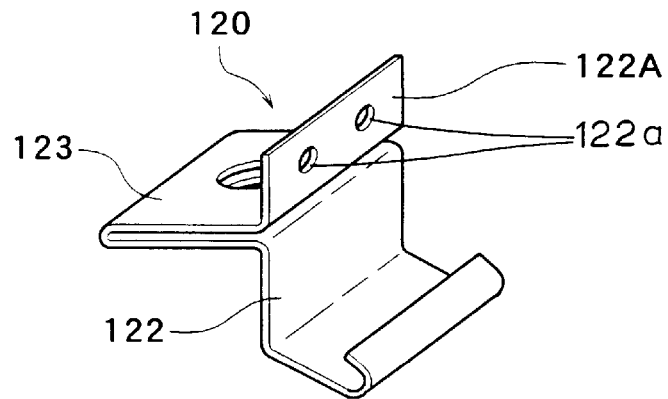

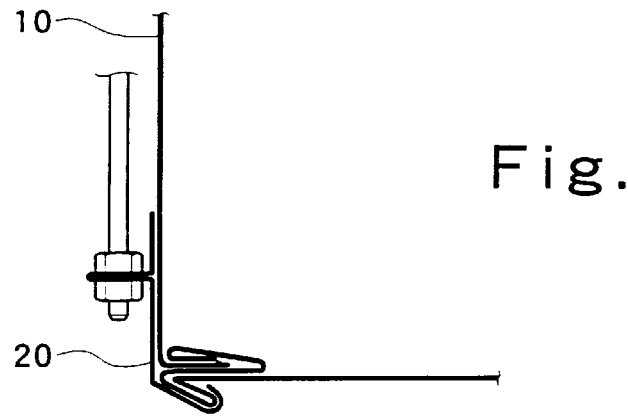
Fig.16
Fig.17
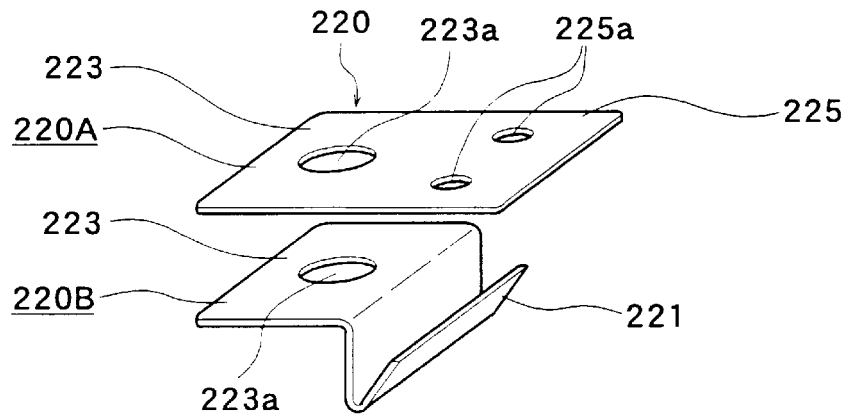
Fig.18
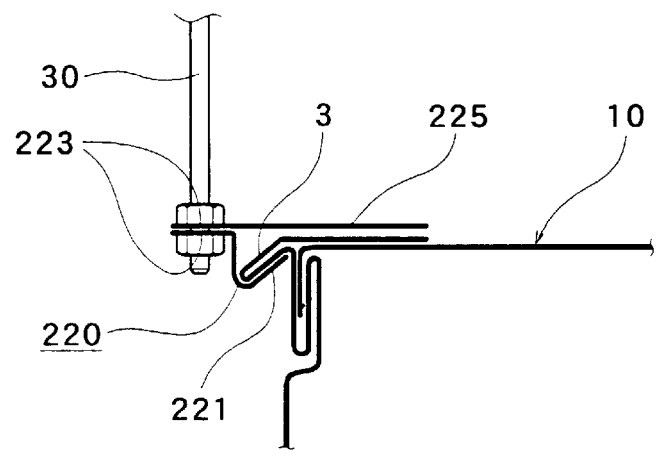

DUCT JOINT STRUCTURE, ASSEMBLY TOOL, DUCT ASSEMBLY METHOD AND HANGER

The present invention relates to a duct joint structure for assembling a duct used for air conditioning or venting equipment or the like building equipment, an assembly tool for assembling the joint portion, an assembly method of a duct, and an optimum hanger for the duct with the joint structure.

BACKGROUND OF THE INVENTION

Conventionally, the duct used for air conditioning or venting equipment (FIG. 12) is formed in a cylinder having a rectangular section by connecting two pairs of plate members 1, 2 using a joint structure of what is called "the button punch snap seam" as shown in FIG. 10 or what is called "the Pittsburgh seam" as shown in FIG. 11.

The former joint structure is such that the forward end portion of a plate member (first plate member) 1 constituting one joint portion is bent substantially at right angle, an end 1A of the bent portion is fitted into a U-shaped portion 2A at the end portion of a plate member (second plate member) 2 constituting the another joint portion thereby to form a joint. In this case, what is called "the return stops" 1a are formed at the end 1A on the first plate member 1 and adapted to engage an engaging portion 2b formed at the end of the second plate member 2. The forward end portion of the first plate member 1, once fitted as shown in FIG. 10b, therefore, would never come off. Therefore, the jointing work is very simple and requires no trouble other than fitting.

For the latter "Pittsburgh seam", on the other hand, as shown in FIG. 11, a bent end A1 at the forward end portion of a plate member (first plate member) 1 constituting one of the joint portion is fitted into a U-shaped portion 2A at an end portion of a plate member (second plate member) 2 constituting the other joint portion. Then, a protruded end portion 2c of the second plate member 2 is bent along the side 1b of the first plate member 1, as shown in FIG. 11b thereby to form a joint. In this case, the end 1A of the first plate member 1 is fixed (pressed) from above by the protruded end portion 2c of the second plate member 2. Once the joint structure is complete, therefore, the first plate member 1 would never come off. In addition, the double fitted structure of the joint including the first plate member 1 and the second plate member 2 has a considerably improved strength and a high hermeticity.

Consequently, a duct joint requiring hermeticity employs the "Pittsburgh seam".

In current practice, the work of forming the joint of the button punch snap seam and the Pittsburgh seam described above, i.e., the duct assembly work, is performed by the worker hitting a corner 4 of the plate member 1 or the neighborhood thereof to fit it into the second plate member 2. Actually, however, the joint is made of plates (steel-plate or the like) as thin as 0.3 to 1.2 mm. Strictly speaking, therefore, the plate member 1 or 2 is not sufficiently linear to allow the bending work for easily fitting the plate members along the longitudinal direction of the duct. As a result, the fitting work requires a considerable magnitude of force and a multiplicity of hits by the hammer. The fitting work (assembly work), therefore, must be performed by a very strong person. In addition, the hitting sound of the hammer is so harsh to the ears as to possibly cause the worker a hearing problem. In the absence of suitable soundproof equipment, therefore, the complaints against the noise would rush in from the neighboring residents. A similar problem is posed by the work of bending the protruded end portion 2c of the second plate member 2 described above.

Further, the time consuming manual work of said assembly is low in efficiency and the duct is therefore expensive to fabricate.

In addition, the manual work makes it impossible to assemble the duct (fit the joint) at the construction site where the working time is limited. Unavoidably, therefore, the duct is presently assembled and stored in the factory, and transported the site using a truck and crane in accordance with the progress of the field work. Also, the delivery of an assembled duct in a truck encounters the problem of a bulkiness for the weight, leading to a very low transportation efficiency. What is more, the duct cannot be securely bound by rope or the like as it would be deformed. The result is a high risk of dropping the assembled duct in transit.

Furthermore, when hoisting the duct to the desired building floor by crane at the site, the small weight and the bulkiness exposes the hoisting work to the direct effect of the wind. It is therefore very difficult to deliver the duct into desired position by crane.

Another very troublesome problem posed by the bulkiness for the duct suppliers is that temporary storage of the duct where it is to be mounted interferes with the water or electricity work conducted concurrently. Also, the bulkiness is a factor which makes it impossible to store a large amount of standardized ducts in the factory. Even in the custom production, storage of completed ducts requires a large space.

Also, the conventional duct hanger, as shown in FIG. 25, is composed of an angle steel member 50 cut to the width of a duct 10 and having each end thereof formed with a hole 50a through which to apply a rod member 30.

In such a case, the duct work for an ordinary building requiring ducts of a variety of widths makes it necessary to prepare the angle steel member meeting the varying width of the duct. Also, this hanger, as shown in FIG. 24, must always be hanged by a pair of steel rod members for structural reasons. As a result, the place where the hanger can be installed is limited by the building structure and equipment. Another inconvenience is the fact that the duct is hanged at unnecessarily short pitches on the inner periphery side of the corners thereof. In addition, the angle steel member, when hanged by the ends thereof with steel rods, is liable to undesirable rotate about the steel rod members.

Another disadvantage of the conventional duct hanger system is that since the duct is only placed on the angle steel member, an air flow, if any, in the duct is a frequent cause of duct vibrations and noises in cooperation with the angle steel member.

The present invention has been developed in view of the above-mentioned situation, and the object of the invention is to provide a duct joint structure, an assembly tool, a duct assembly method and a hanger most suitable for the duct with the joint structure, which is not bulky and therefore convenient for storage or transportation, can be fitted quickly, and can be assembled easily even by a worker of less than average strength with a minimum of assembly noises.

SUMMARY OF THE INVENTION

A duct joint structure according to the invention is characterized in that a guide rail protrudes at an angle of not more than 90 degrees with respect to the outer surface of a second plate member spaced from a U-shaped groove thereof is formed along the length of a duct.

With the joint structure having this configuration, one plate member (a first plate member) can fitted easily and quickly into the second plate member with a minimum force by use of an assembly tool with an engaging means (an engaging portion or an engaging flange) thereof engaging the guide rail, thereby facilitating the assembly work. Also, the configuration of the joint structure is not very complicated. Further, storage of the duct in the form of plate members obviates the problem of bulkiness and contributes greatly to an improved storage and a higher transportation efficiency. Also, the delivery work using the crane is not hardly affected by the wind. The simple and quick assembly work permits the use of a small lot adjacent to the construction site (duct attachment site) for an improved working efficiency.

In the joint structure according to the invention, in view of the fact that the protruding guide rail is formed at an end portion of the second plate member and an end of the second plate member extends from the guide rail to the first plate member, the extended portion can be superposed on the upper side of the first plate member. The joint structure meeting the requirement of the conventional "Pittsburgh seam" can thus be easily formed.

A duct assembly tool according to one aspect of the invention is for assembling the duct joint structure described above and characterized by comprising an engaging portion for engaging the protruded guide rail, a pressure portion arranged adjacent the second plate member side by a distance equivalent to the length from the engaging portion to a coupling corner of the first plate member, and a holding portion arranged spaced from the engaging portion.

The use of this assembly tool permits even a weak person to manually assemble the joint structure according to the invention easily and quickly with a minimum of noises.

A duct assembly tool according to another aspect of the invention is for assembling a joint structure of the above-mentioned duct and characterized by comprising an engaging roller including an engaging flange adapted for engaging the protruded guide rail, a pressure roller with a pressure surface thereof located at a distance equivalent to the length from the engaging roller to a coupling corner of the first plate member, a frame for holding the engaging roller and the pressure roller in predetermined relative positions, and drive means for driving the pressure roller.

The use of this powered assembly tool permits the joint structure according to the invention to be assembled very quickly and easily with a minimum of noises.

A duct assembly method according to a further aspect of the invention is for assembling the above-mentioned duct and characterized in that a guide rail protruded at an angle of not more than 90 degrees outside of the second plate member away from the U-shaped groove is formed along the length of the duct; and a tool having an engaging portion for engaging the protruded guide rail and a pressure portion arranged inside of the second plate member by a distance equivalent to the length from the engaging portion to the coupling corner of the first plate member is operated in such a manner that, with the forward end portion of the first plate member bent at an angle in conformance with the above-mentioned orthogonal relation and kept in contact with the opening of the U-shaped groove of the second plate member, the engaging portion of the tool is engaged with the guide rail while at the same time bringing the pressuring portion thereof into contact with the outer surface of the first plate member and rotated by a predetermined angle by the holding portion thereof. These steps of work are repeatedly performed along the length of the plate members thereby to assemble the joint.

According to this duct assembly method, the joint structure of the duct can be easily and quickly assembled by the use of the above-mentioned tool.

A duct assembly method according still another aspect of the invention is for assembling a duct and is characterized in that a guide rail protruded at an angle of not more than 90 degrees with respect to the outer surface of the second plate member spaced from the U-shaped groove thereof is formed along the length of the duct; and a tool including an engaging roller having an engaging flange for engaging the protruded guide rail, a pressure roller having the roller pressure surface thereof located at a distance equivalent by the length from the engaging roller to the coupling corner of the first plate member, a frame for holding the engaging roller and the pressure roller in predetermined relative positions, and drive means for driving the pressure roller, is operated in such a manner that, with the forward end portion of the first plate member bent substantially at right angle and kept into contact with the opening of the U-shaped groove of the second plate member and with only the leading portion of the first plate member fitted in the opening, the flange of the engaging roller of the tool is engaged with the guide rail while at the same time bringing the pressure roller into contact with the outer surface of the first plate member and the drive means is driven to move the tool along the length of the plate members thereby to assemble the joint.

According to this duct assembly method, the joint structure of the duct can be easily and very quickly assembled using the power tool.

A hanger according to a further invention is used for hanging a duct taking advantage of the duct joint structure of the invention and is characterized by comprising an engaging portion bent at an end thereof to engage the guide rail, a contact portion bent from the engaging portion and extended along the side wall of the duct, a bent hanger portion formed on the contact portion, and a mounting means for mounting a hanger in the hanger portion.

With the above hanger, the engaging portion is bent at an acute angle of not less than 90 degrees and the hanger portion is formed substantially horizontally.

A hanger according to another embodiment is for hanging a duct using the duct joint structure according to the invention and is characterized by comprising two plate members superposed vertically, the lower plate being formed with an engaging portion at the forward end thereof and bent to engage the guide rail, a pressure portion formed at the forward end of the upper plate member for pressing the upper surface of the duct, and a base end portion formed with a through hole on each of the upper and lower plates thereby to form the holding portion.

In a hanger according to another embodiment, the upper and lower plates are formed by bending a single piece of plate and the engaging portion is bent at an acute angle of not less than substantially 90 degrees. Thus, a structure is realized facilitating storage during the fabrication of a hanger.

With a hanger according to a further embodiment, the corners of the duct are set in position at the portion bent at right angle. Coupled with the engagement by the engaging portion, a structure is realized superior in the function of fixing the duct. Also, the structure can be easily hanged using the guide rail of the duct, so that the working time is shortened. And, preparation of only one type of hanger is sufficient to meet different duct widths. Also, it is not necessary to attach the hanger at both sides of the duct on every attaching joint. The required storage space and preparations of a hanger are thereby reduced.

BRIEF DESCRIPTION OF THE DRAWINGS

FIG. 1 is a perspective view showing a partly cut-away section of a configuration of a joint structure according to an embodiment (a joint structure according to the "button punch snap seam" specification) of the present invention, in which

FIG. 3 is a perspective view showing a partly cut-away section of a joint structure according to another embodiment (a joint structure according to the "Pittsburgh seam" specification) of the present invention, in which

FIG. 10 is a partly diagram showing a conventional joint structure (a joint structure according to the "button punch snap seam" specification), in which

FIG. 11 is a partly diagram showing a conventional joint structure (a joint structure according to the "Pittsburgh seam" specification), in which

FIG. 13 is a perspective view showing a hanger according to the present invention.

FIG. 14 is a partly cross sectional view of a duct showing a configuration of the essential parts for hanging the duct by the hanger shown in FIG. 13.

FIG. 15 is a perspective view showing a configuration of a hanger according to another embodiment.

FIG. 16 is a partly cross sectional view of a duct showing a configuration of the essential parts used for suspending the duct by the hanger shown in FIG. 15.

FIG. 17 is a perspective view showing a configuration of a hanger for hanging the duct by the upper end thereof according to an embodiment.

FIG. 18 is a partly cross sectional view of a duct showing a configuration of the essential parts for hanging the duct by the hanger shown in FIG. 17.

DETAILED DESCRIPTION OF THE PREFERRED EMBODIMENTS

Now, embodiments of the present invention will be specifically explained with reference to the drawings.

Figure 1A:
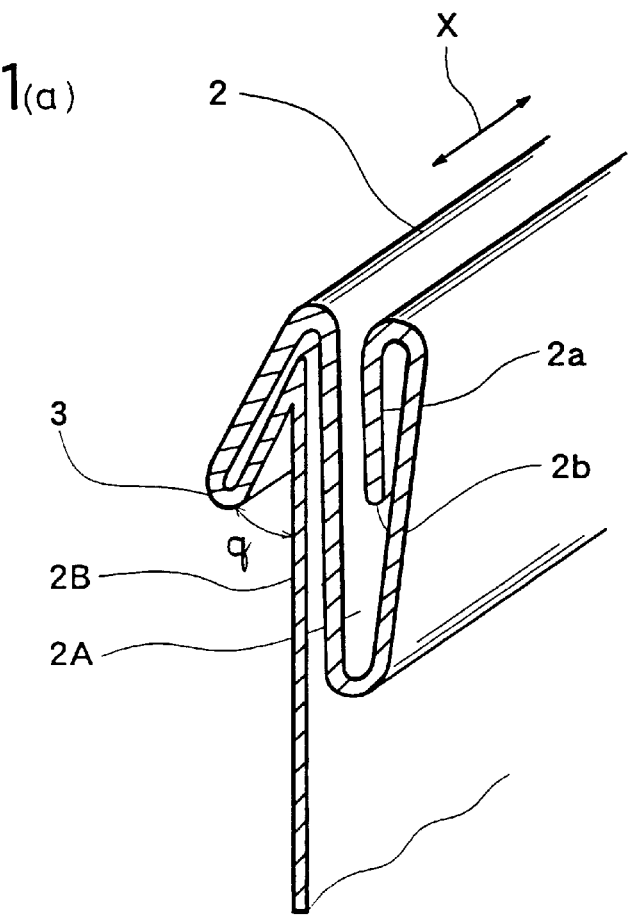
FIG. 1a is a perspective view showing a configuration of a second plate member constituting a joint structure.
Figure 1B:
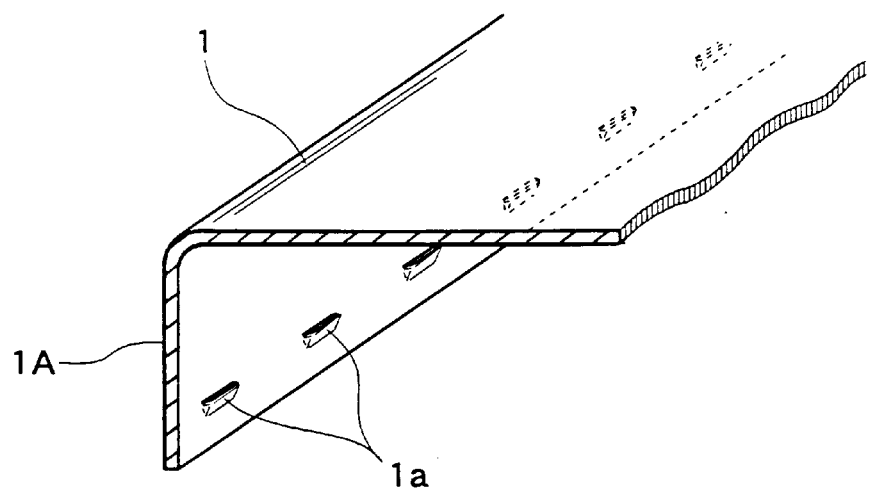
FIG. 1b is a perspective view showing a configuration of a first plate member.
Figure 2:
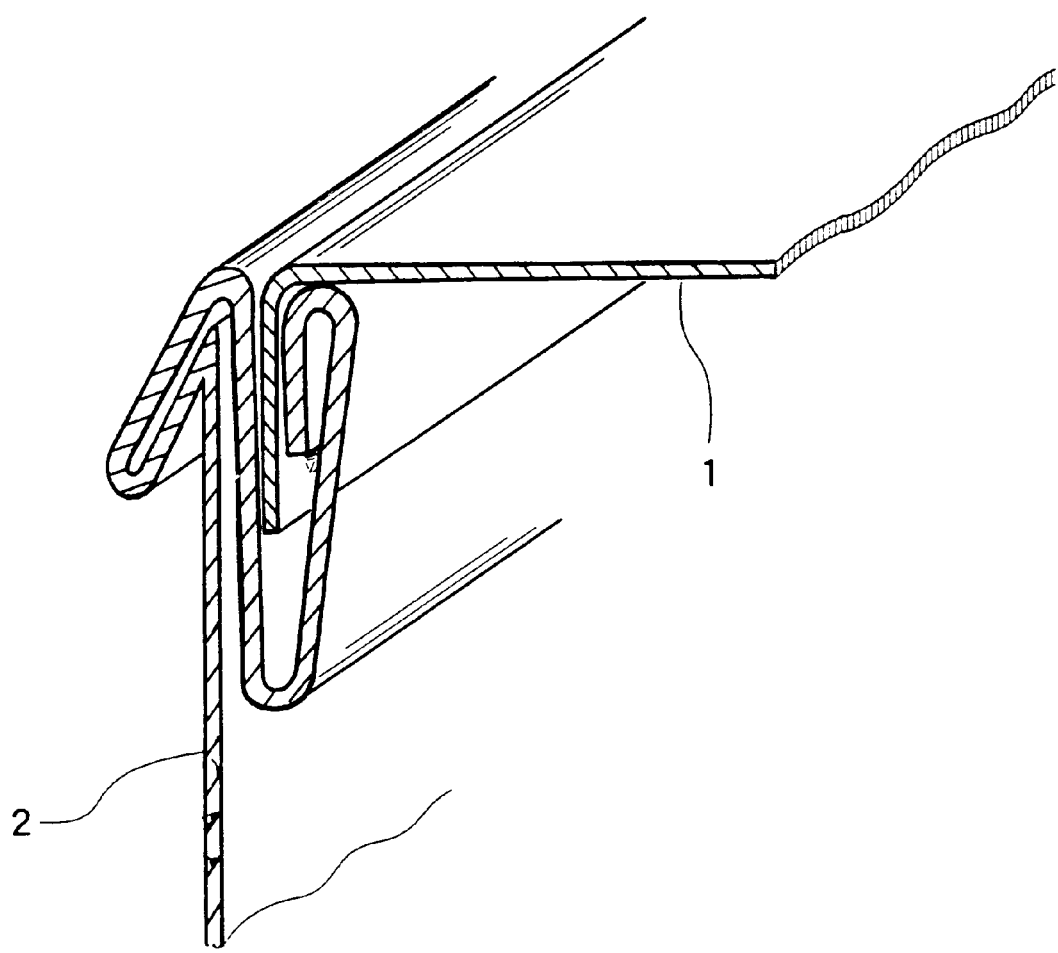
FIG. 2 is a partly perspective view showing a section of the joint structure of FIG. 1 assembled to form a duct.

In FIGS. 1 and 2, numeral 1 designates a first plate member, and numeral 2 a second plate member. The end portion 1A of the first plate member 1, i.e., the left end portion in FIG. 1b is bent substantially at right angle. The end portion 1A has a plurality of return stops 1a at predetermined intervals for preventing the plate member 1 fitted from coming off from the plate member 2.

The forward end portion of the second plate member 2 is formed with a U-shaped groove 2A bent appropriately. The plate end 2a of the U-shaped groove 2A is folded back toward the U-shaped groove 2A, and thus forms an engaging portion 2b for engaging said return stops 1a.

The outer surface 2B side at the forward end portion of the second plate member 2, i.e., the portion outside the U-shaped groove 2A is formed continuously with a protruded guide rail 3 along the length of the plate member 2 (in the direction of arrow X in FIG. 1a) at an angle q of about 30 degrees to the outer surface 2B on the side spaced from the U-shaped groove 2A (left side in FIG. 1a).

The angle q at which the guide rail 3 is formed can be any other angle capable of engaging the tool downward (against the tension from above) during the assembly work described later. In other words, the angle q may be any one not more than 90 degrees. The angle with the outer surface 2B, if 5 degrees or less, however, would make the gap too narrow to make smooth engagement. The angle therefore is preferably not less than 5 degrees in actual practice. With the duct of a type called the "elbow" bent in L-shape, however, the angle q of 0 degree or there about is preferable considering the bending work into L-shape having a considerable radius of curvature.

Consequently, the second plate member 2 according to this embodiment has a configuration in which the forward end portion thereof, as shown in FIG. 1a, is bent five times, thereby contributing to an improved rigidity of the forward end portion of the plate member 2.

Now, an embodiment involving what is called the "Pittsburgh seam" specification will be explained with reference to FIGS. 3 and 4.

Figure 3A:
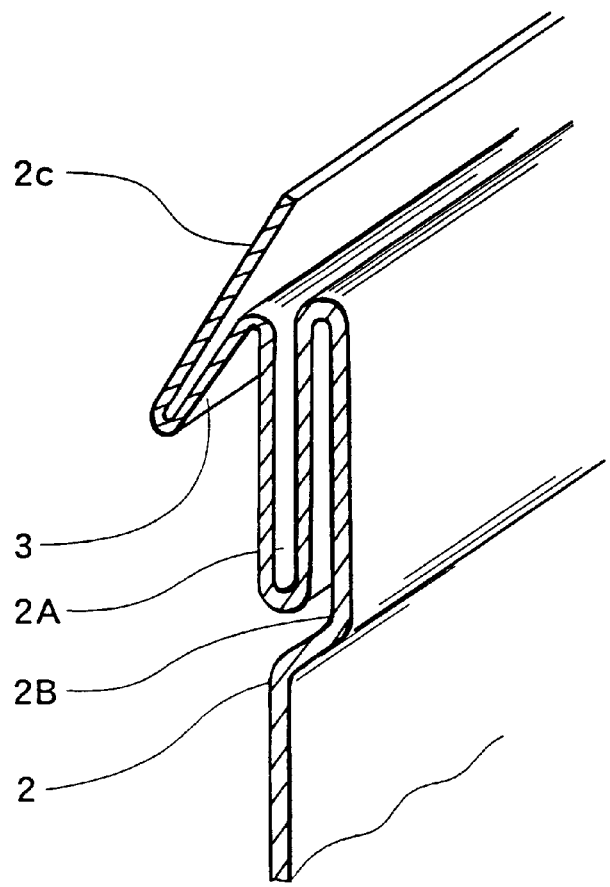
FIG. 3a is a perspective view showing a configuration of the second plate member constituting a joint structure.

This embodiment is basically similar to the embodiment shown in FIGS. 1 and 2. In order to meet the "Pittsburgh seam" specification, as shown in FIG. 3a, the guide rail 3 is formed on the forward end portion of the second plate member 2. Specifically, according to this specification, as shown in FIG. 3a, the U-shaped groove 2A is formed on the outer surface 2B of the forward end portion of the second plate member 2, and the guide rail 3 is formed nearer to the forward end of the plate member 2 than the U-shaped groove 2A. Moreover, the portion 2c further forward an end side of the guide rail 3 is extended beyond the guide rail 3. In other words, this extension is directed toward the first plate member 1. Due to this configuration, the engaging portion 2b (see FIG. 1(a)) according to the aforementioned embodiment is absent in the present embodiment.

Figure 3B:
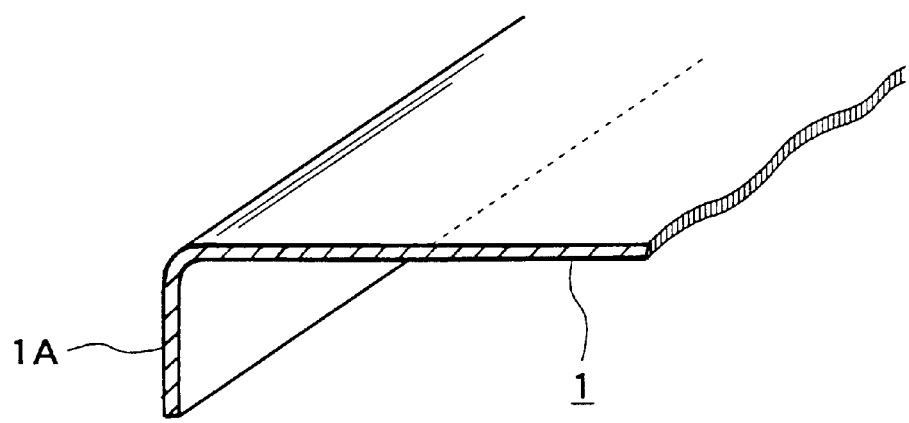
FIG. 3b is a perspective view showing a configuration of the first plate member.

Also, the configuration of the first plate member 1, like that of the embodiment shown in FIGS. 1 and 2, has an end portion 1A of the plate member 1, i.e., the left end portion in FIG. 3b, bent substantially at right angle.

Figure 12:
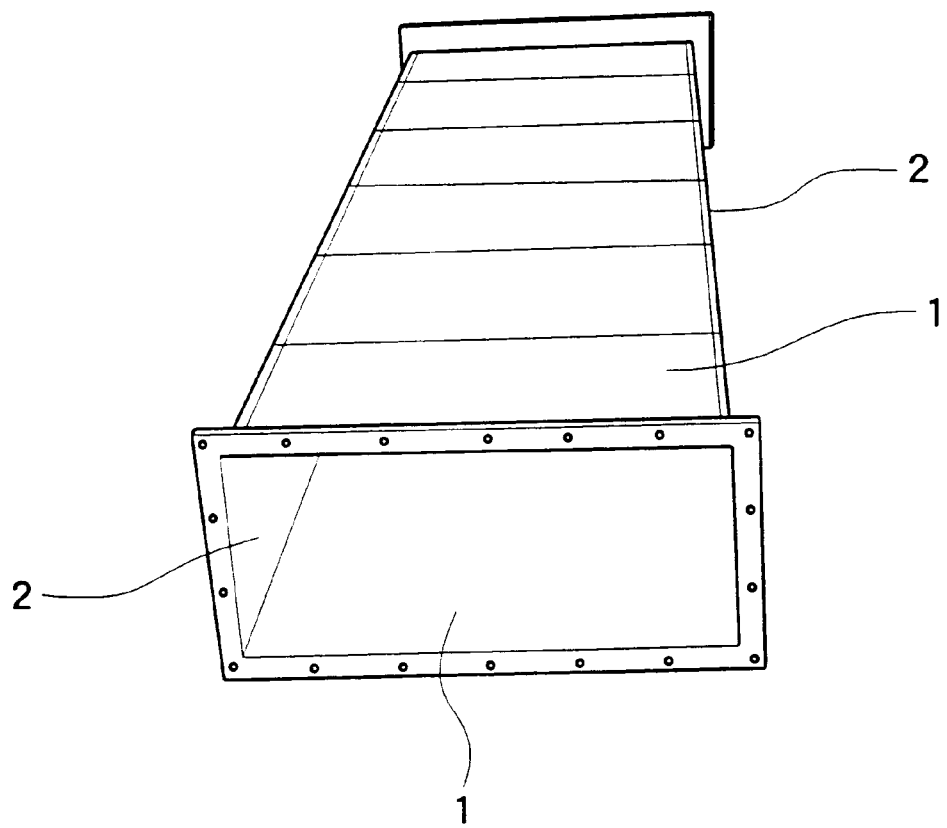
FIG. 12 is a perspective view showing the external appearance of the whole duct assembled with a joint structure.

The joint structures each comprising the "first plate member" and the "second plate member" configured as shown in FIGS. 1 and 3 can be assembled in the following-described manner to form a duct shown in FIG. 12. Specifically, the above-mentioned joint structures can be easily, quietly and quickly assembled using a hand tool (assembly tool) shown in FIGS. 6 and 7 (hand-operated assembly tool according to this embodiment) or a power tool shown in FIGS. 8 and 9 (an electrically-driven assembly tool according to this embodiment). In other words, while the forward end of the end portion 1A of the first plate member 1 shown in FIG. 1b is kept in contact within the U-shaped groove 2A of the second plate member 2 shown in FIG. 1a, the first plate member 1 and the second plate member 2 with the joint structure is assembled using the hand tool 6 shown in FIG. 6 or the power tool 7 shown in FIG. 8.

Figure 6:
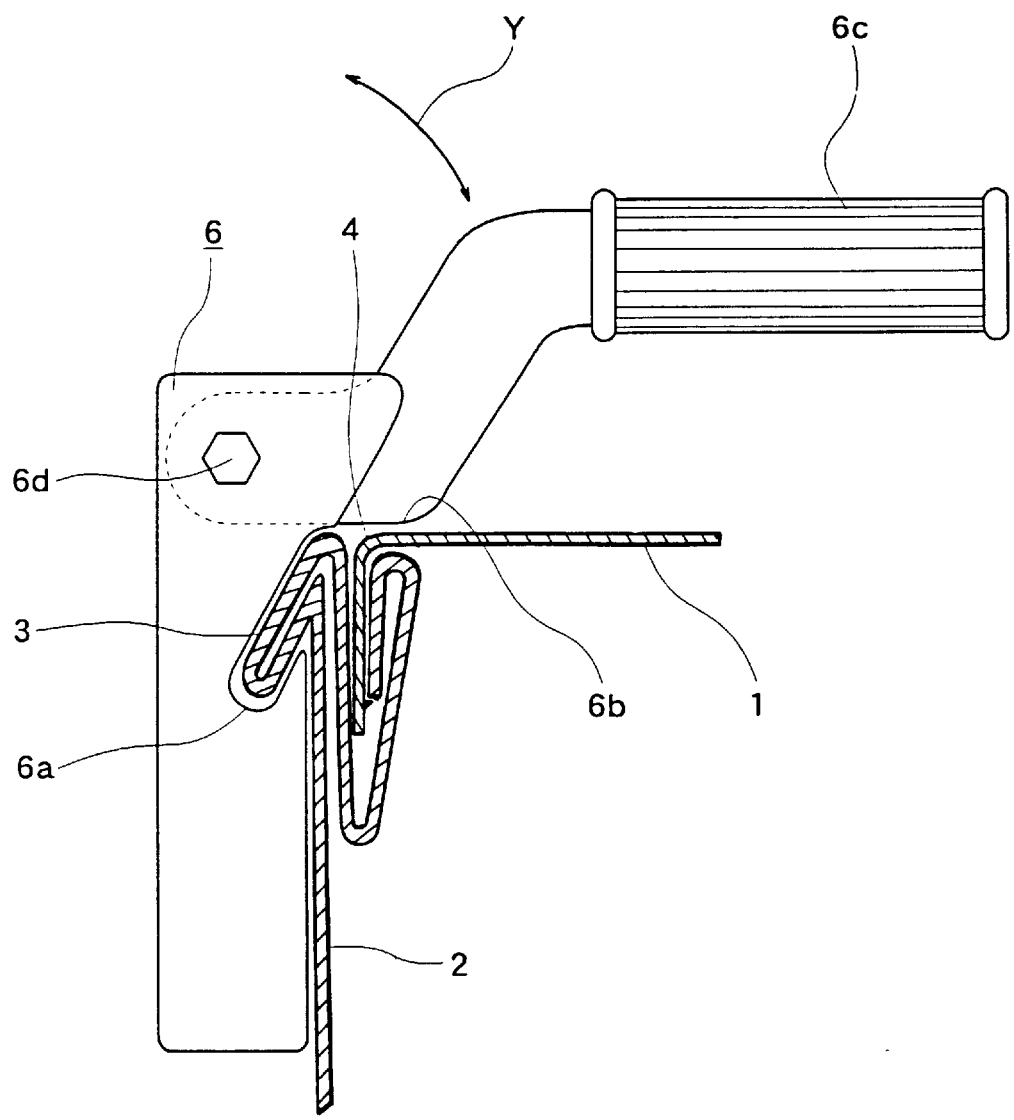
FIG. 6 is a diagram showing a side view of a hand tool and a side sectional view of the joint structure assembled using the hand tool.

The hand tool 6 shown in FIG. 6 has an engaging portion 6a for engaging the guide rail 3 at the lower portion thereof, a pressure portion 6b arranged adjacent (right-side in FIG. 6) of the second plate member 2 distant from the engaging portion 6a at a position in opposed relation to the coupling corner portion 4 of the first plate member 1, and a holding portion (a hand holding portion) 6c arranged extended further rightward of the pressure portion 6b. The holding portion 6c is spaced from the engaging portion 6a. Specifically, the hand tool 6, like what is called the "can opener", is configured of the engaging portion 6a constituting a supporting point, the pressure portion 6b constituting a point of action distant from the engaging portion 6a, and the holding portion 6c constituting a point of application further distant from the point of action. The engaging portion 6a is formed at substantially the central portion of a first band-shaped member, and a second band-shaped member is pivotally connected with said first band-shaped member by a shaft member 6d. The pressure portion 6b and the holding portion 6c are formed at the second band-shaped member.

In the case of the hand tool 6, the engaging portion 6a is fixed (with said guide rail), and the holding portion 6c is pivoted in the direction of arrow Y with respect to the shaft member 6d. In this way, the pressure portion 6b can cause the end portion 1A of the plate member 1 in contact therewith as described above to be fitted (pressure-fitted) into the U-shaped groove 2A of the plate member 2 easily with a minimum of noise and a small force taking advantage of the principle of leverage as shown in FIG. 6.

Figure 4:
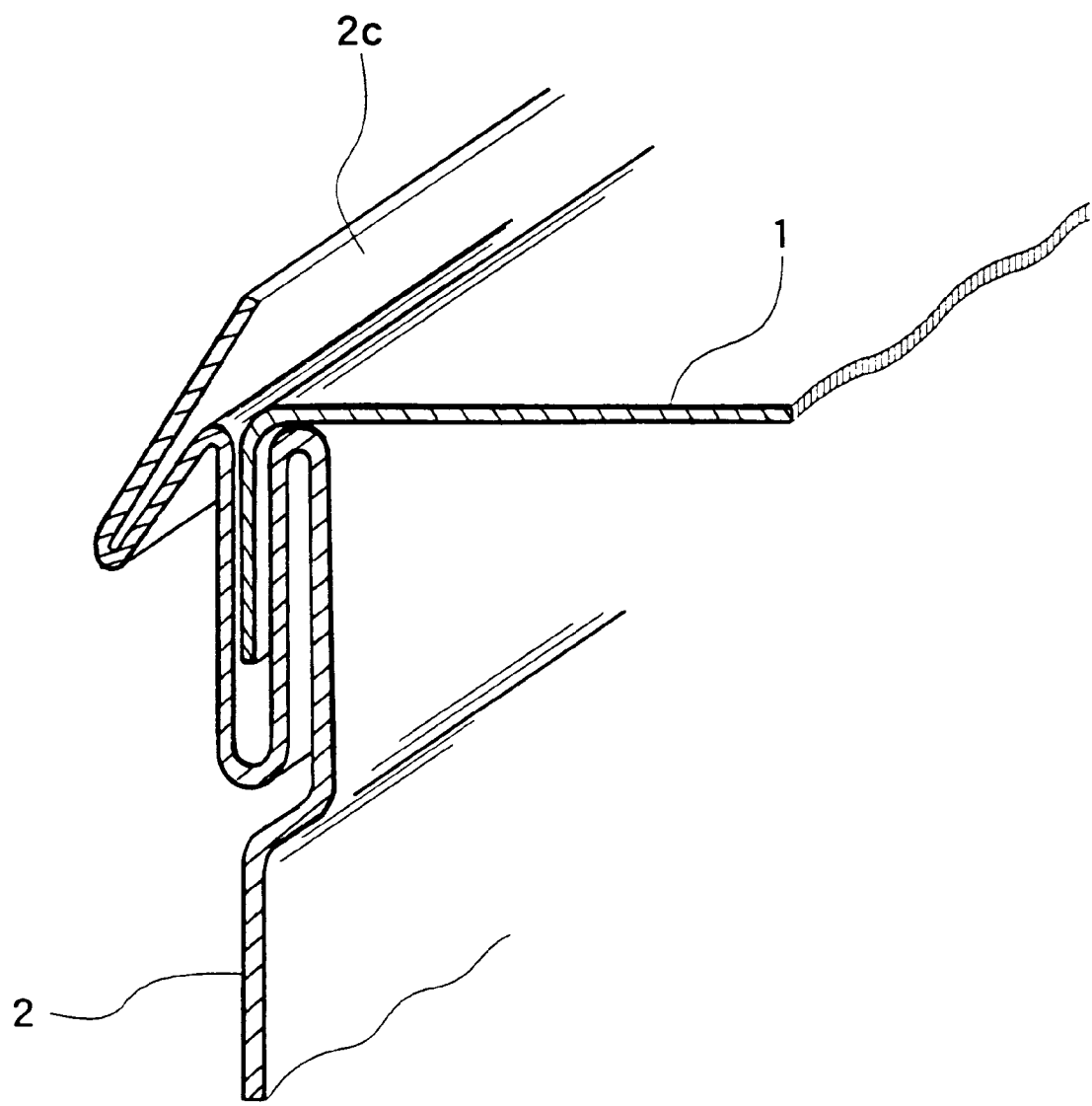
FIG. 4 is a partly perspective view of a section showing the joint structure of FIG. 3 in the process of assembly.
Figure 5:
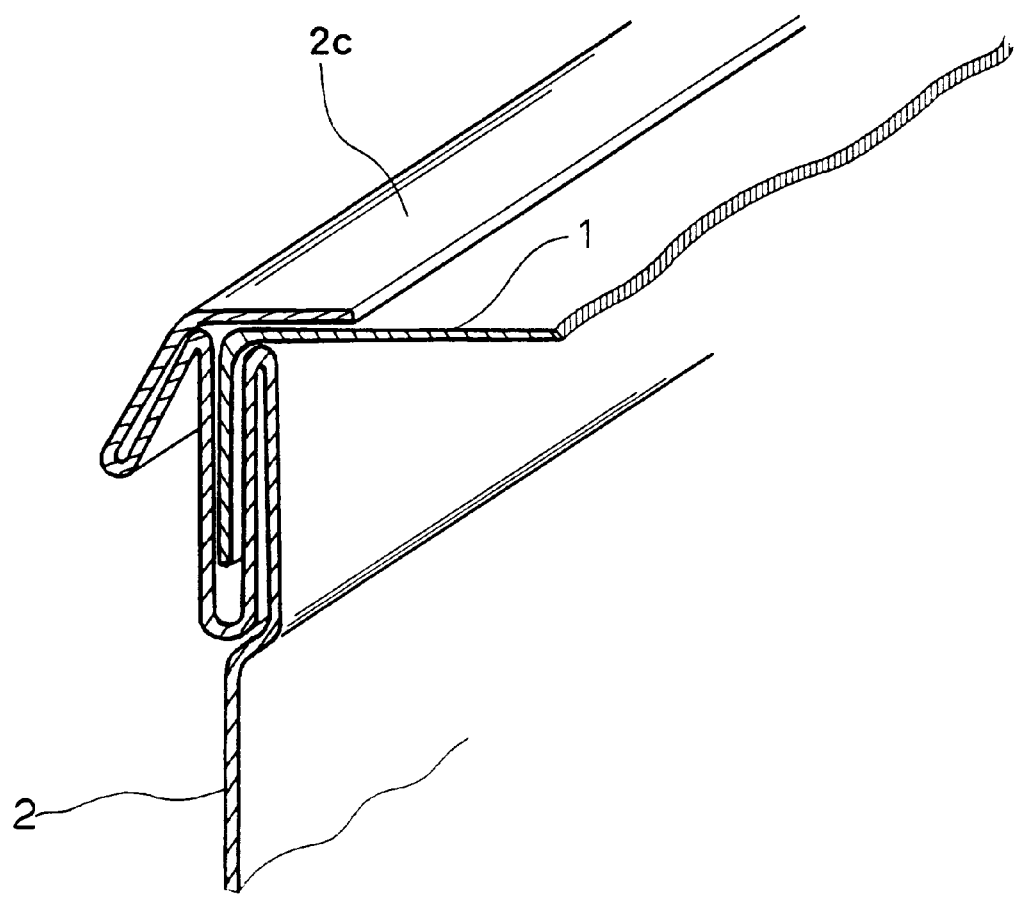
FIG. 5 is a partly perspective view of a section showing the joint structure of FIG. 3 upon complete assembly.
Figure 7:
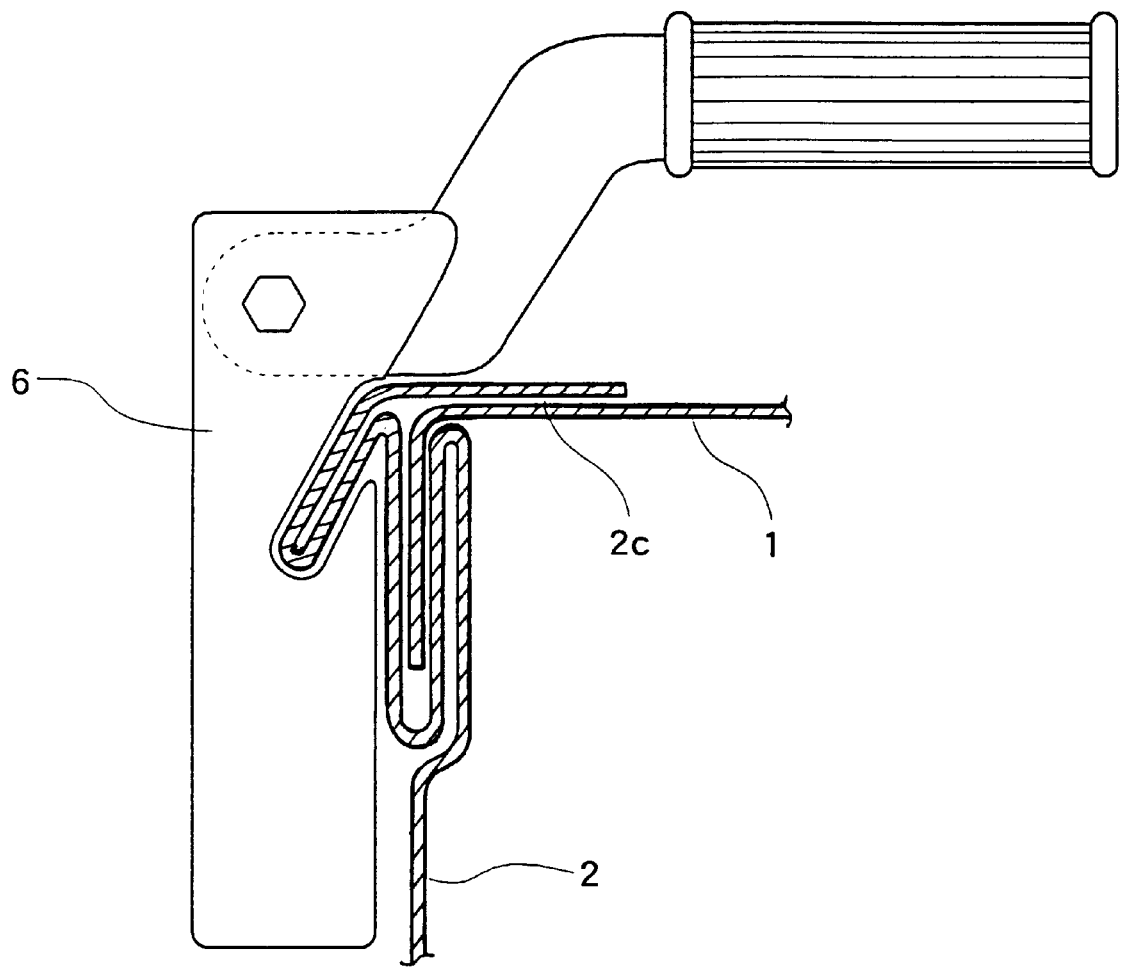
FIG. 7 is a diagram showing a side view of a hand tool and a side sectional view of the joint structure assembled using the hand tool.

The same can be said of the "Pittsburgh seam" specification, according to which the first plate member 1 can be fitted as shown in FIGS. 4 and 5 into the second plate member 2, and bending the second plate member 2 easily with a small force and with a minimum of noise as shown in FIG. 7 using the hand tool 6. In the case of the "Pittsburgh seam", however, the fitting work shown in FIG. 4 and the bending work shown in FIG. 5 actually proceed at the same time using the hand tool shown in FIGS. 6 or 7 (or the power tool shown in FIGS. 8 or 9). In the process, the pressure portion 6b of the hand tool 6 is fitted into contact with the outer surface 2B of the forward end portion 2c of the second plate member 2, so that the forward end portion 2c of the second plate member 2 is bent and the end portion 1A is fitted into U-shaped groove 2A completely to form the "Pittsburgh seam". With the "Pittsburgh seam", the return stops 1a of the plate member 1 are not required as the forward end portion 2c of the second plate member 2 is bent as described above.

The above-mentioned hand tool, in spite of the fact that it is very compact, lightweight and easy to carry and that the working efficiency is improved more than several times that of the conventional assembly work, still requires manual work and therefore has its own limit as to the work volume that can be performed per unit time.

Figure 8:
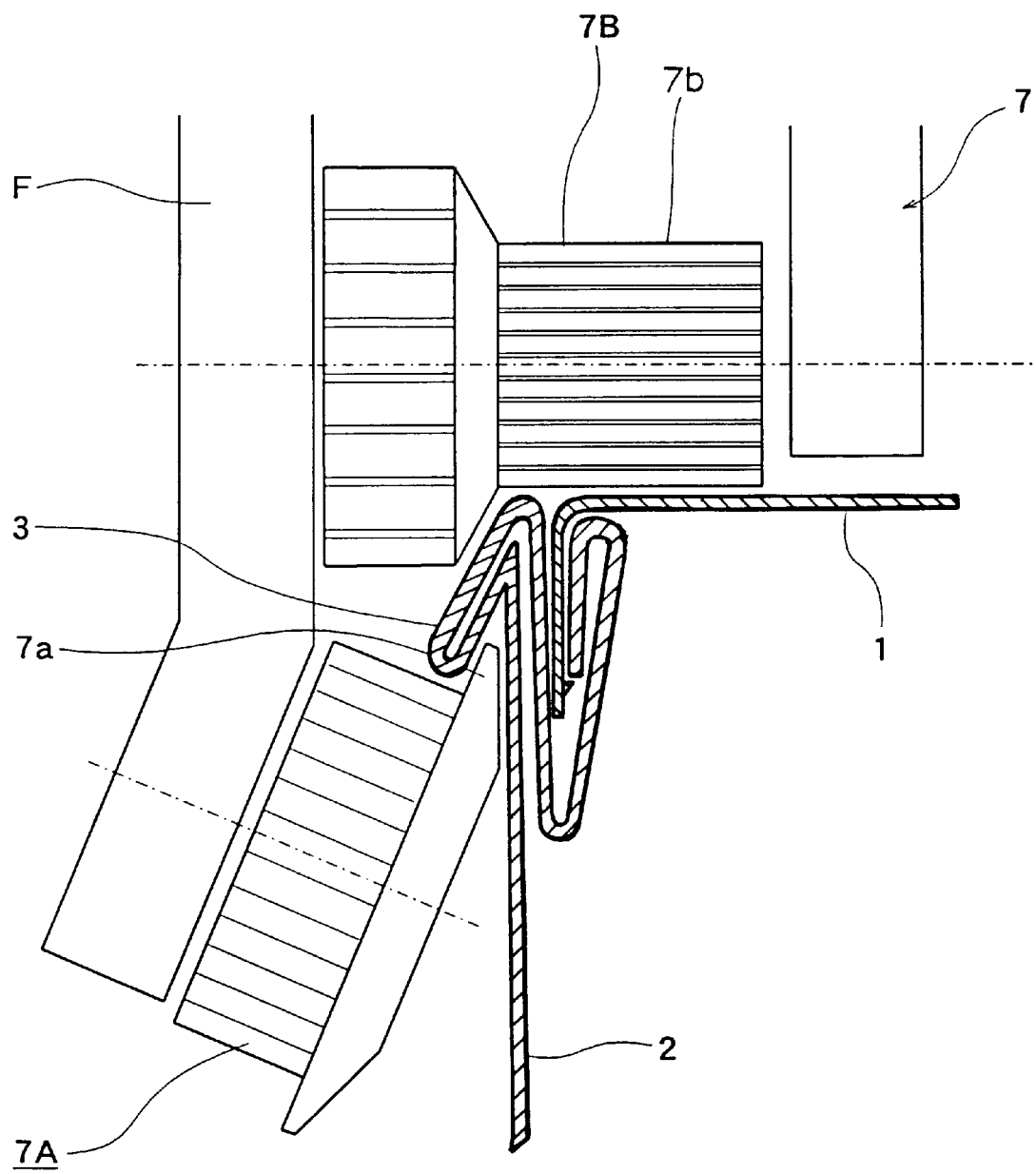
FIG. 8 is a diagram showing a partly side view of a power tool and a side sectional view of the joint structure assembled using the power tool.
Figure 9:
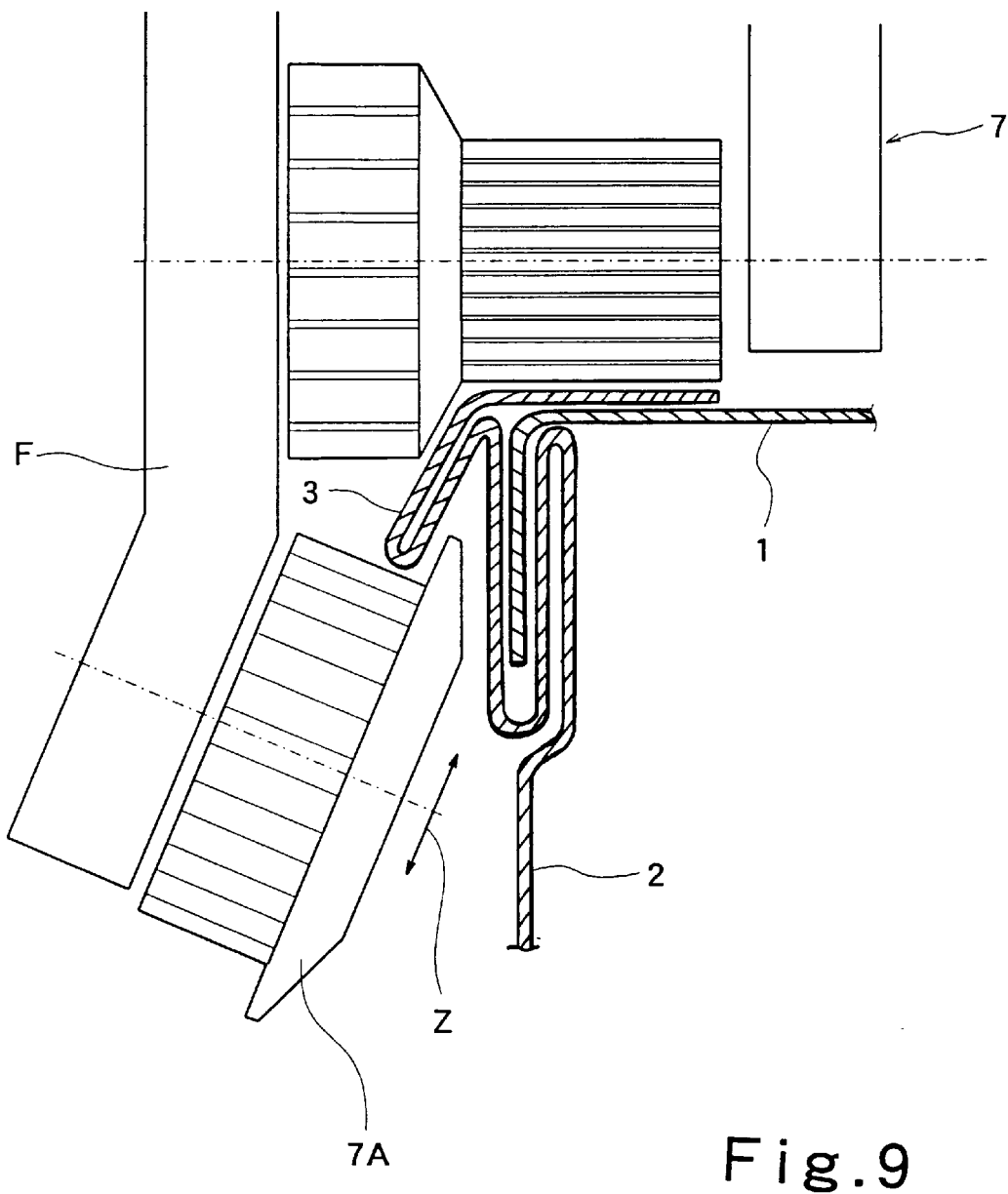
FIG. 9 is a diagram showing a partly side view of a power tool and a side sectional view of the joint structure assembled using the power tool.
Figure 10A:
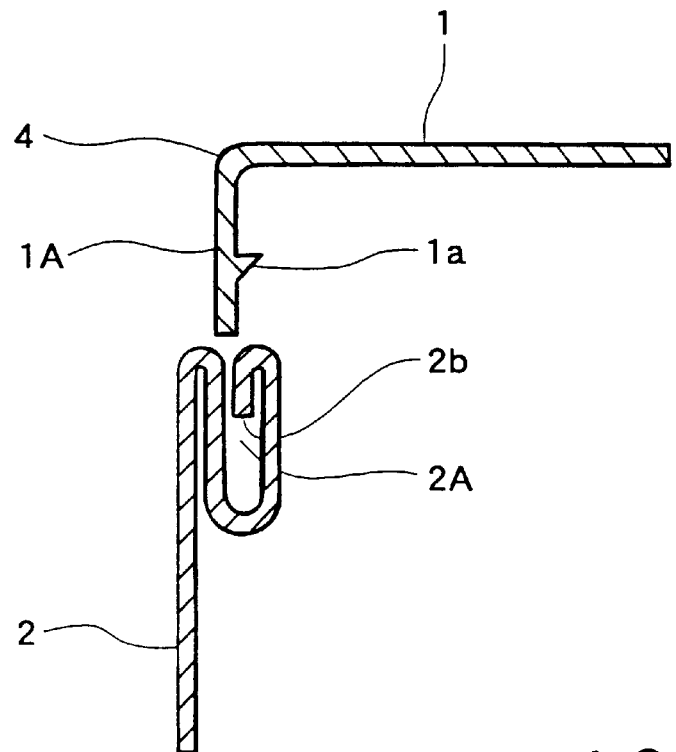
FIG. 10a is a diagram showing a state before fitting (before assembly)
Figure 10B:
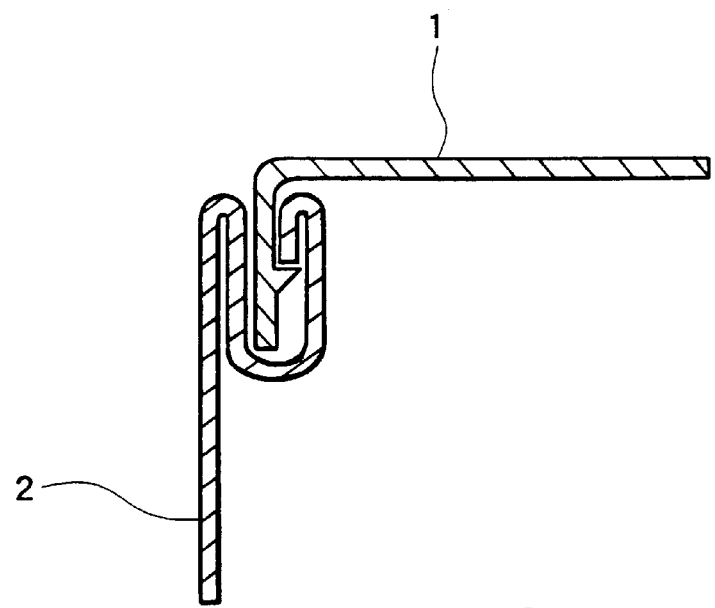
FIG. 10b is a diagram showing an assembled state.
Figure 11A:
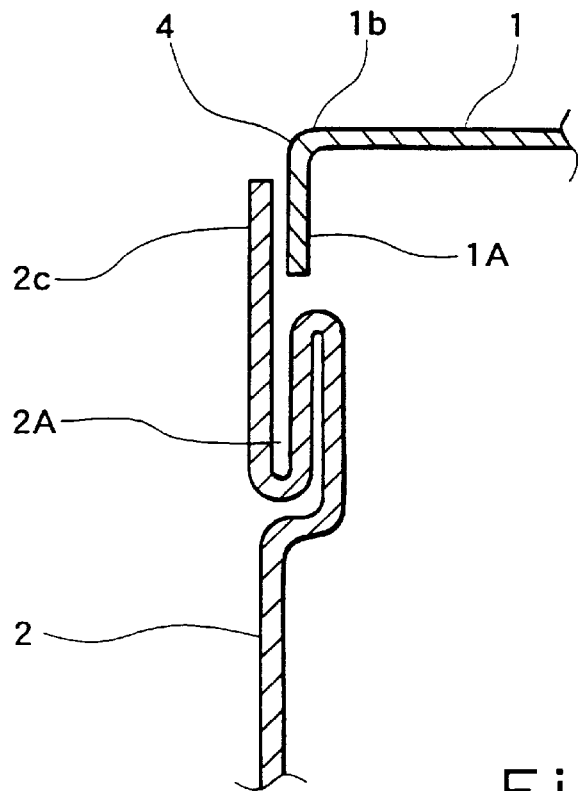
FIG. 11a is a diagram showing a state before fitting (before assembly)
Figure 11B:
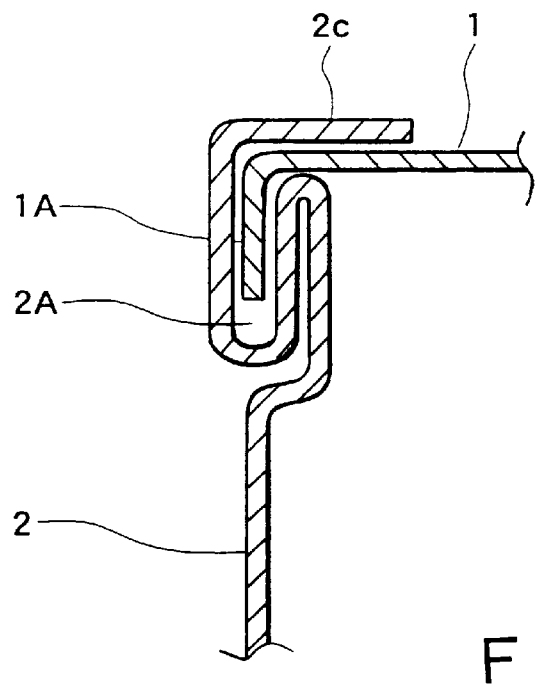
FIG. 11b is a diagram showing an assembled state.

In view of this, the power tool as shown in FIG. 8 can be used as an alternative to the above-mentioned hand tool. Specifically, the power tool 7, as shown in FIG. 8, comprises an engaging roller 7A having an engaging flange portion 7a adapted to engage the guide rail 3, a pressure roller 7B having a roller pressure surface 7b thereof located at a position distant from the engaging roller 7A in spaced relationship with the coupling corner 4 of the first plate member 1, a frame F for holding the engaging roller 7A and the pressure roller 7B in relative positions, and a drive means (not shown) for driving the pressure roller 7B. The drive means may be an electric motor, a pneumatic motor or a hydraulic motor. The engaging roller 7A may be configured to be supported on the frame F movably in the direction of arrow Z in FIG. 9, in which case the engaging roller 7A can be easily fitted when it is engaged with the guide rail 3.

With the power tool 7, the forward end of the end portion 1A of the first plate member 1 shown in FIGS. 1b and 3b is placed in contact, and fitted (or fitted and bent for the "Pittsburgh seam") with hand or hammer only initially, within the U-shaped groove 2A of the second plate member 2 shown in FIGS. 1a and 3a. When a power switch is turned on, the engaging roller 7A travels along the guide rail 3 of the plate member 2 while the plate member 1 is being pressured downward by the pressure roller 7B. The end portion 1A of the plate member 1 that is in contact but not yet fitted can thus be easily and quickly fitted (or fitted and bent for the "Pittsburgh seam") into U-shaped groove 2A of the second plate member 2 shown in FIGS. 2 and 5 with a minimum of noise by only holding the tool.

The duct thus assembled with the above-mentioned joint structure can be easily hanged by the hangers shown in FIGS. 13, 15, 17, 19, 20, 22 and 23. Specifically, once a duct is formed, as shown in FIG. 14, the resulting configuration is such that the bottom 10a of the duct 10 has the guide rail 3. This guide rail 3 is engaged with the engaging portion 21 of the hanger 20 shown in FIG. 13. The engaging portion 21, as shown in FIG. 13, is bent in conformance with the bending angle of the guide rail 3, or specifically, according to this embodiment, at an acute angle of not less than 90 degrees with an included angle of about 70 degrees. A bent contact portion 22 is extended along the side wall of the duct 10 at the base of the protruded engaging portion 21 side (upper side in FIG. 13) apart by a distance equivalent to the length from the guide rail 3 to the corner of the duct 10. A horizontal hanger portion 23 is formed by being bent at right angle at the base end (upper end) of the contact portion 22. The hanger portion 23 has a hole 23a through which to apply a steel rod constituting a hanger member 30 (FIG. 14). Also, according to this embodiment, the contact portion 22 has a pair of holes 22a for fixing the side wall of the duct 10 in contact therewith. The holes 22a are used for fixing the duct 10 as required.

This hanger 20, as shown in FIG. 14, can be used with the guide rail 3 located on the bottom 10a of the duct 10. The engaging portion 2 is engaged with the guide rail 3 thereby to bring the contact portion 22 into contact with the side wall of the duct 10. As required, the duct is fixed using the holes 22a by bolt or rivet, in which state the duct 10 can be hanged from the ceiling or the beam by use of at least a steel rod constituting the hanger member 30 inserted in the hole 23a of the hanger portion 23.

As an alternative to the hanger 20, as shown in FIG. 15, a hanger 120 can be used in which the hanger portion 123 is formed in double plates with the base end thereof bent at right angle in agreement with the extension of the contact portion 122 thereby to form a second contact portion 122A having holes 122a. With this configuration, as shown in FIG. 16, the hanger can be fixed more snugly to the duct 10 over a larger contact area. In addition, the strength of the holding portion 123 is increased.

In a hanger 220 according to another embodiment shown in FIG. 17, two pieces of plate 220A, 220B are overlapped in doubled. The lower plate 220B has an engaging portion 221 at the forward end thereof, and the upper plate 220A has a pressure portion 225 at the forward end thereof for pressing the upper surface of the duct. The base ends (on the left side in FIG. 17) of the upper and lower plates 220A, 220B have a hanger portion 223, which has a hole 223a through which to apply the hanger member 30 (FIG. 18). Also, holes 225a are formed in the pressure portion 225 for fixing the duct 20 by screws or the like.

Figure 19:
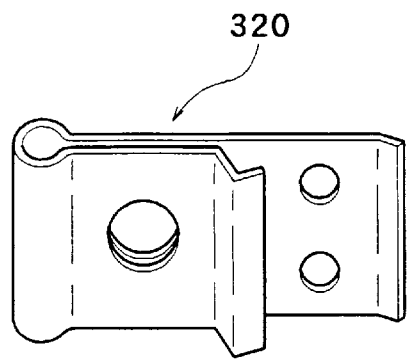
FIG. 19 is a perspective view showing a configuration of a hanger as viewed at a slightly different angle according to still another embodiment.

Further, in place of this embodiment, a hanger 320 as shown in FIG. 19 is applicable in which a single plate is bent into the same form as if separate upper and lower plates are connected at the base ends thereof to obtain a similar shape to the preceding embodiment. In such a case, a superior configuration is realized in which the parts required are reduced in number, so that the hanger can be mounted and stored more conveniently, and can be fabricated with a lower cost.

The hangers shown in FIGS. 17 and 19 can be used for the duct 10 assembled with the guide rail 3 located at the upper side end thereof, as shown in FIG. 18. Thus, basically the same function and effect can be attained as the embodiment shown in FIGS. 13 and 15.

Figure 20:
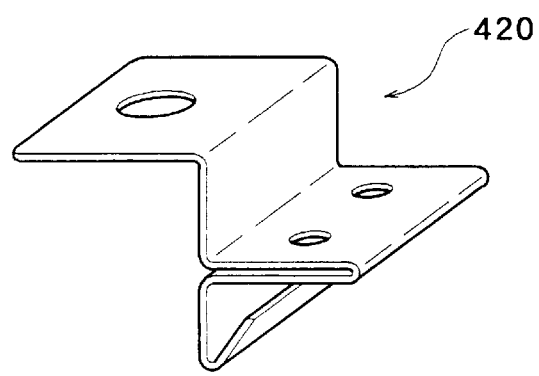
FIG. 20 is a perspective view showing a configuration of a hanger according to a further embodiment.
Figure 21:
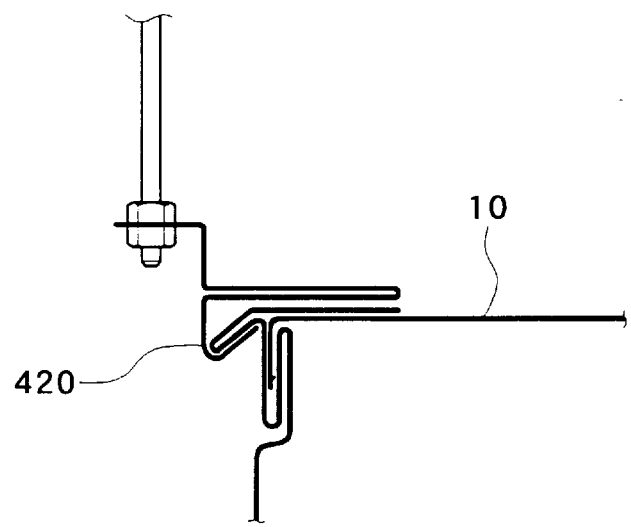
FIG. 21 is a partly cross sectional view of a duct showing a configuration of the essential parts for hanging the duct by the hanger of FIG. 20.
Figure 22:
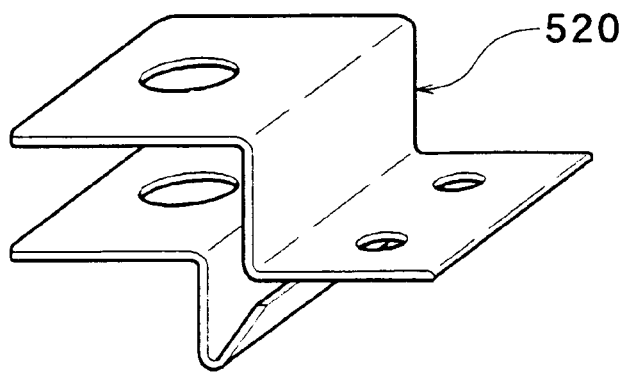
FIG. 22 is a perspective view showing a configuration of a hanger according to another embodiment.
Figure 23:
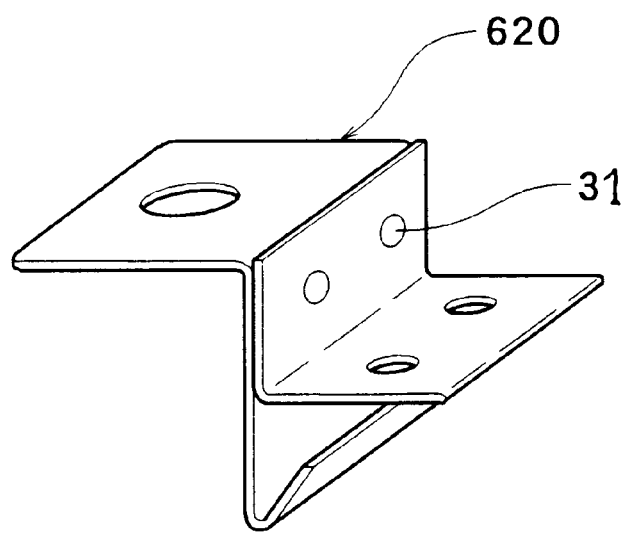
FIG. 23 is a perspective view showing a configuration of a hanger according to another embodiment.
Figure 24:
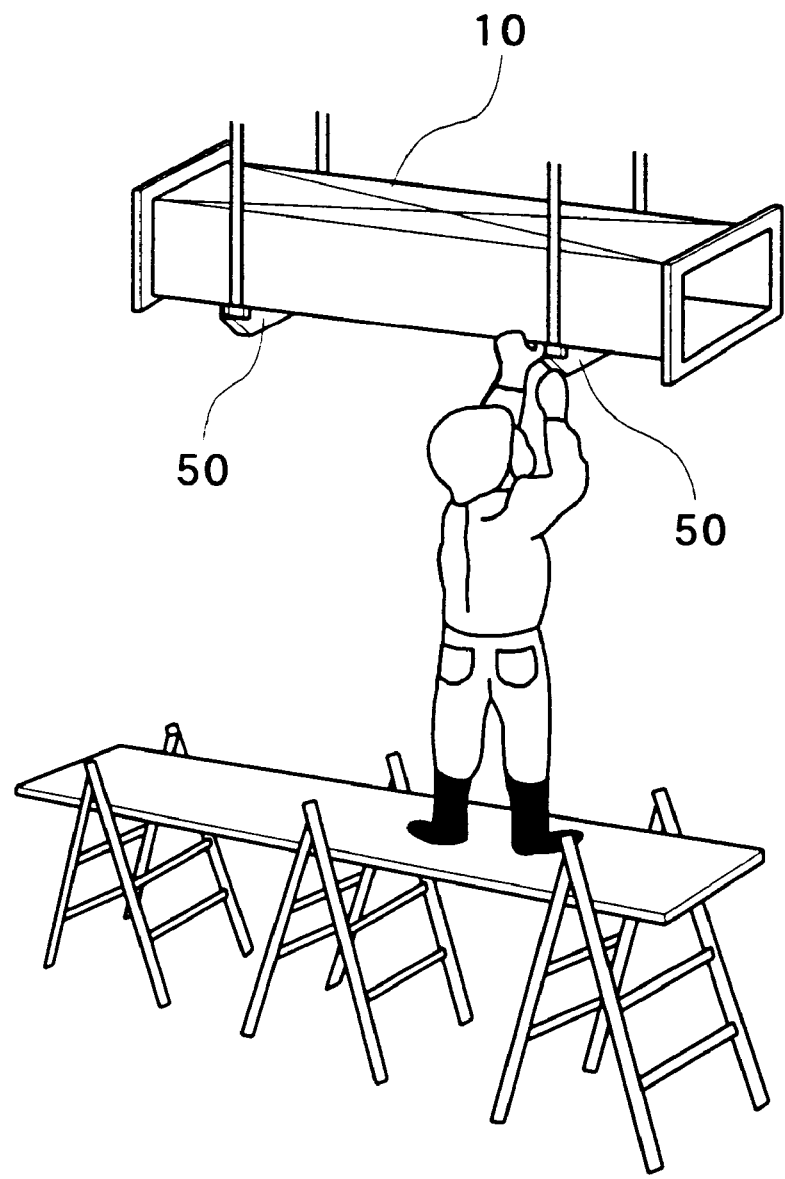
FIG. 24 is a perspective view showing the manner in which the work is conducted for hanging a duct using a conventional hanger.
Figure 25:
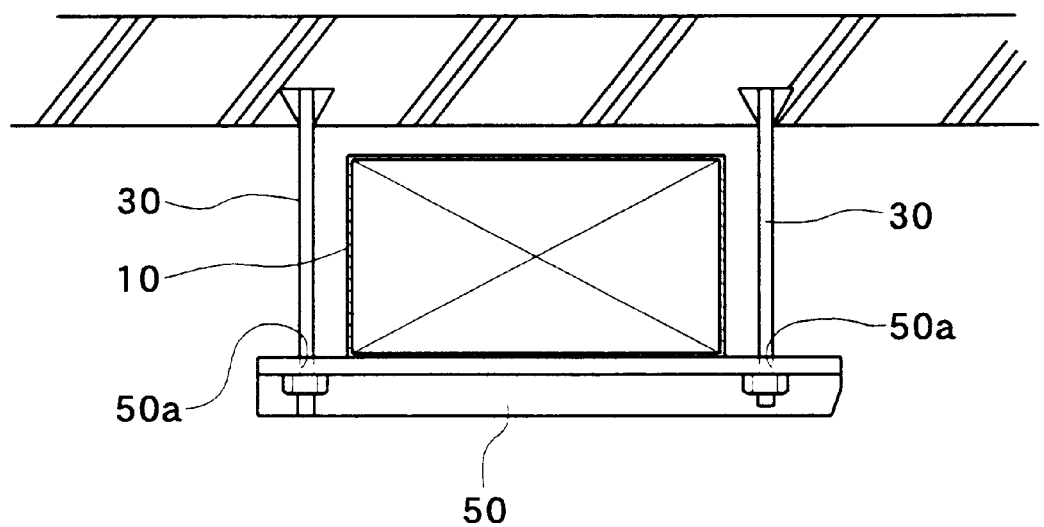
FIG. 25 is a sectional view showing a configuration of a conventional hanger used for hanging a duct.

Also, with the duct 10 assembled with the guide rail 3 located at the upper ends of the sidewalls, the hangers 420, 520, 620 having configurations as shown in FIGS. 20, 22, 23, respectively, can be used. These hangers can be conveniently used in the presence of a beam or the like structural member on both sides of the upper end of the duct 10, as shown in FIG. 21. In FIG. 23, numeral 31 designates spot welding points for fixing plates pressed separately.

According to this invention, a hanger can be assembled easily and quickly with a minimum of noises even by a worker of less than average strength. Therefore, it can be assembled appropriately in accordance with the work progress at the construction site.

The duct can be stored in the form of plate members. A large number of the ducts mass-produced in a factory as standardized components can thus be stored in a limited space. Also, it can be delivered to the site in a full truck load permitted under the law, thereby improving the transportation efficiency as well as the efficiency of load/unload work for a reduced chance of dropping in transit. Further, a large amount of the duct members (plate members) according to the invention can be hoisted by crane to the desired floor of a building within a short time without being affected by the wind substantially.

Further, the plate members constituting the duct can be stored at the site of the actual duct attaching work or the neighborhood thereof, so that the duct can be assembled at a location adjacent to the site where the duct members are hanged as required. The transportation and storage efficiency in or to the site thus are considerably improved.

Further, even in the case where the work other than the duct work is performed in the same space, the duct can be assembled concurrently with another work quickly with a minimum of noise. The wasteful time (waiting time) which could not be avoided for the conventional site work can thus be reduced to the great advantage for the equipment constructor.

Also, the use of the above-mentioned hand tool or the power tool permits even a small worker to assemble the duct easily and quickly. As a result, the labor shortage is obviated and the assembly cost reduced for this type of work.

Furthermore, the hangers according to this invention can be used for any duct width variations. Therefore, the provision of only one type of the hanger is sufficient. Consequently, the amount of the hangers to be delivered to the working site or to be stored at the warehouses can be reduced. Further, in view of the fact that a symmetric hanger is not necessarily needed by the hanger portions, the limitation of the hanger space imposed by beams or other interference is considerably relaxed. Since the hanger according to the invention can be engaged easily with the duct, the efficiency of the hanger work is improved. Also, noises due to duct vibrations are minimized.

We claim:

1. A joint structure of a duct comprising at least two plate members configured substantially in orthogonal relation, the first plate member having the end of the orthogonal portion thereof bent substantially at right angle in conformance with said orthogonal relation, the second plate member having a U-shaped groove formed at a forward end portion thereof to accommodate the bent portion of the first plate member, characterized in that a guide rail protruding from said second plate member at an acute angle less than 90 degrees and more than 5 degrees with respect to an outer surface of the second plate member is formed along the length of the duct on the side of the second plate member spaced from said U-shaped groove.

2. A joint structure of a duct according to claim 1, characterized in that said protruding guide rail is formed at an end portion of said second plate member, the end of the second plate member being extended toward said first plate member from the guide rail.

3. A hanger for hanging a duct using a duct joint structure according to claim 1, characterized by comprising an engaging portion having an end thereof bent at an acute angle less than 90 degrees to engage said guide rail, a contact portion bent from said engaging portion and extended along a side wall of said duct, and a hanger portion bent with respect to said contact portion, said hanger portion having a mounting means for mounting a hanger member.

4. A hanger for hanging a duct using a duct joint structure according to claim 2, characterized by comprising an engaging portion having an end thereof bent at an acute angle less than 90 degrees to engage said guide rail, a contact portion bent from said engaging portion and extended along a side wall of said duct, and a hanger portion bent with respect to said contact portion, said hanger portion having a mounting means for mounting a hanger member.

5. A hanger according to claim 3, characterized in that said engaging portion is bent at an acute angle less than 90 degrees, and said hanger portion is formed substantially horizontally.

6. A hanger for hanging a duct using the duct joint structure according to claim 1, characterized in that said hanger is formed of two vertically overlapped plates, the lower plate being formed at the forward end thereof with an engaging portion bent to engage said guide rail, the upper plate being formed at the forward end thereof with a pressure portion for pressing the upper surface of said duct, said upper and lower plates having the base ends thereof formed with a through hole thereby to form a hanger portion.

7. A hanger for hanging a duct using the duct joint structure according to claim 2, characterized in that said hanger is formed of two vertically overlapped plates, the lower plate being formed at the forward end thereof with an engaging portion bent to engage said guide rail, the upper plate being formed at the forward end thereof with a pressure portion for pressing the upper surface of said duct, said upper and lower plates having the base ends thereof formed with a through hole thereby to form a hanger portion.

8. A hanger according to claim 4, characterized in that said engaging portion is bent at an acute angle less than 90 degrees, and said hanger portion is formed substantially horizontally.

9. A hanger according to claim 7, characterized in that said upper plate and said lower plate member formed integrally by bending a single plate material, and said engaging portion is bent substantially at an acute angle less than 90 degrees.

10. A joint structure of a duct and a hanger for hanging said duct comprising:

at least two plate members configured substantially in orthogonal relation, the first plate member having the end of the orthogonal portion thereof bent substantially at right angle in conformance with said orthogonal relation, the second plate member having a U-shaped groove formed at a forward end portion thereof to accommodate the bent portion of the first plate member, a guide rail protruding from said second plate member at 90 degrees or less with respect to an outer surface of the second plate member is formed along the length of the duct on the side of the second plate member spaced from said U-shaped groove;

an engaging portion having an end thereof bent to engage said guide rail, a contact portion bent from said engaging portion and extended along a side wall of said duct, and a hanger portion bent with respect to said contact portion, said hanger portion having a mounting means for mounting a hanger member; and said engaging portion is bent at an acute angle less than 90 degrees, and said hanger portion is formed substantially horizontally.

11. A joint structure of a duct and a hanger for hanging said duct comprising:

at least two plate members configured substantially in orthogonal relation, the first plate member having the end of the orthogonal portion thereof bent substantially at right angle in conformance with said orthogonal relation, the second plate member having a U-shaped groove formed at a forward end portion thereof to accommodate the bent portion of the first plate member, a guide rail protruding from said second plate member at 90 degrees or less with respect to an outer surface of the second plate member is formed along the length of the duct on the side of the second plate member spaced from said U-shaped groove;

said hanger is formed of two vertically overlapped plates, the lower plate being formed at the forward end thereof with an engaging portion bent to engage said guide rail, the upper plate being formed at the forward end thereof with a pressure portion for pressing the upper surface of said duct, said upper and lower plates having the base ends thereof formed with a through hole thereby to form a hanger portion.

12. A hanger according to claim 11, characterized in that said upper plate and said lower plate member formed integrally by bending a single plate material, and said engaging portion is bent substantially at an acute angle less than 90 degrees.

* * * * *